July 20, 1943.  C. L. PETERSON  2,324,642
ELECTROMAGNETIC VALVE OPERATOR
Filed May 3, 1940
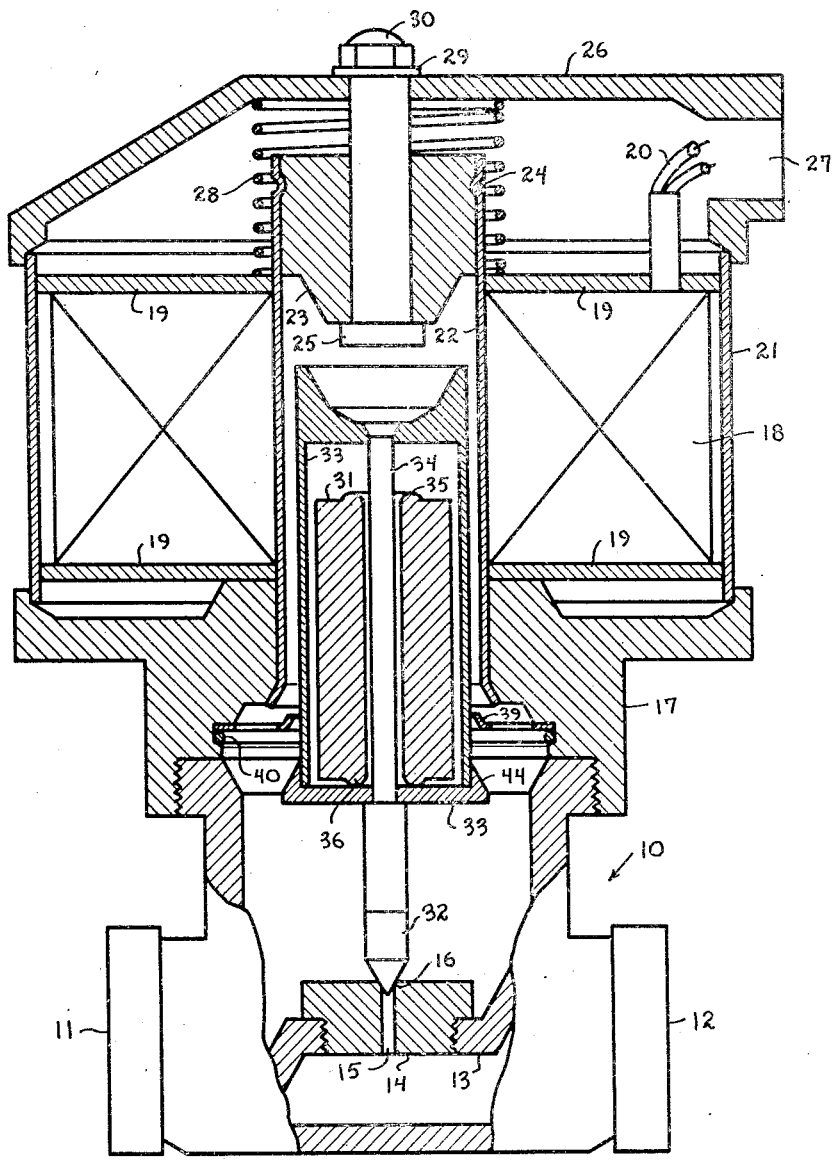
INVENTOR
Clarence L. Peterson
BY George H Fisher
ATTORNEY

UNITED STATES PATENT OFFICE 2,324,642

ELECTROMAGNETIC VALVE OPERATOR

Clarence L. Peterson, Berkeley, Calif., assignor to Minneapolis-Honeywell Regulator Company, Minneapolis, Minn., a corporation of Delaware Application May 3, 1940, Serial No. 333,148

1 Claim. (Cl. 175—341)

My invention relates to a solenoid mechanism, and more particularly to one designed to operate a valve.

Solenoid operated valves of the prior art have been found to be defective in that they sometimes stick in either open or closed position. One of the principal causes of such faulty action is the formation of a gummy deposit on the seat and face, or on the solenoid core and the stop member against which the core operates. If the gummy deposit occurs on the seat and face, the valve tends to stick in its closed position. If the deposit forms on the core and the stop member, the valve tends to stick in its open position. Such deposits are particularly troublesome when the fluid passing through the valve is one which carries a high proportion of gum-forming substances. Gaseous fuels containing certain petroleum products are especially apt to cause sticking. Sticking of the valve in the open position is most frequent when the fluid passing through the valve is allowed to circulate about the core and related parts for ventilation purposes. Since the fluids most likely to cause sticky gum deposits are those which are most highly combustible and dangerous to handle, it is imperative that means be provided which will overcome the stickiness of the gum deposit and insure proper valve operation under adverse conditions.

An object of this invention is to prevent sticking of a solenoid operated valve.

Another object of the invention is to provide a solenoid valve mechanism having a hammer action tending to free the moving parts of the valve from the surfaces with which they have been in contact while stationary. A further object is to provide such a hammer action which shall be effective on both opening and closing of the valve and upon all surfaces of the core and valve which may be in contact with a stationary member.

A further object is to provide a solenoid valve mechanism wherein a clearance space is provided between coil and core so that fluid may circulate therein for cooling purposes, but wherein the formation of deposits on said core from said fluid are prevented.

A further object is to provide a solenoid valve mechanism wherein the core is sealed in a chamber separate from the valve inlet and outlet chambers.

Other objects of the invention will be apparent from a consideration of the accompanying specification, claim, and drawing, which shows a view, partly in section, of a solenoid valve embodying my invention.

The valve body or casing is generally designated at 10 and has an inlet connection 11 and an outlet connection 12. The valve body 10 is provided with the usual transverse wall 13 which separates the inlet 11 and outlet 12 and is provided with an opening in which a plug 14 is threaded. The plug 14 has an aperture 15 therethrough which is flared at its upper end to provide a valve seat 16. Threaded on the upper portion of the valve casing 10 is a solenoid supporting member 17. Mounted above this supporting member is an electromagnetic coil 18 and above and below said coil are steel plates 19. Lead wires 20 extend upwardly from the coil 18 through the plate 19.

Surrounding the coil 18 and the plates 19 is a casing member 21 of magnetic material. Inside of the coil 18 is a non-magnetic tube 22 of some material of relatively low conductivity, such as brass, which is secured and sealed to the supporting member 17 in any suitable manner. The upper end of the tube 22 is closed by means of a non-magnetic plug 23 of a highly conductive material, such as copper, which is secured to the tube as shown at 24. A stop pin 25, of magnetic material, extends through the plug 23 and through a cover 26 of non-magnetic material having a conduit opening 27 therein to accommodate the lead wires 20. A spring 28 secures the plates 19 and the coil 18 against the supporting member 17. The pin 25 is provided at its outer end with a lock washer 29 and a nut 30. By means of this construction the various parts of the solenoid valve are secured in their proper positions when the nut 30 is tightened on the pin 25.

A shell 33 is loosely mounted within the tube 22 so that fluid from the valve may circulate around it for cooling purposes. A stem 32 of the valve is attached to the shell 33 in any suitable manner. A rod 34 extends axially of the shell 33 and a magnetic core 31 is mounted within the shell 33 so as to slide longitudinally along the rod 34. The top of the shell 33 is countersunk so as to cooperate with the adjacent portions of the plug 23 and the pin 25, thereby forming a means for centering the shell 33 within the tube 22 when the solenoid is energized. If a gummy deposit forms on the cooperating surfaces of plug 23, pin 25, and shell 33, these members are likely to stick together when the coil 18 is deenergized. A flat centering spring 39 is held in place in a groove in the supporting member 17 by a split ring clamp 40. This centering spring cooperates with a flared portion 44 at the lower end of the shell 33 so as to hold the shell in the center of the tube 22. This centering means and that previously described at the top of the shell 33 cooperate to hold the shell in a vertical position while the valve is energized.

The spring 39 has its central portion deflected slightly upward by the flared portion 44 of the shell 33 when the coil 18 is energized. This deflection of the spring causes it to bias the shell 33 for downward movement. When the coil 18 is deenergized, this bias tends to move the shell downward and thus to disengage any surfaces which may be stuck together by a gum deposit. This bias is insufficient, however, to free the shell when an extremely large deposit of gummy substance is present.

The conducting plug 23 serves to shade the magnetic flux produced within the solenoid so that the valve will function without hum or chattering when energized by alternating current. The flux produced by the coil 18 sets up eddy currents in this plug 23. These eddy currents in turn set up a shading flux which is out of phase with the flux produced by the coil 18. The path of the magnetic flux produced by the coil 18 may be traced from the core 31 across the air gap to the lower plate 19, thence through the casing 21 and upper plate 19, back across the air gap to the core 31. The magnetic path followed by the flux produced by the eddy currents in the plug 23 may be traced from the pin 25 through the core 31, across the air gap to the lower plate 19, thence through the casing 21 and the upper plate 19 and across the large air gap between these plates and the upper end of pin 25. Although the flux in either one of these paths passes through zero twice with every complete cycle of the alternating current, the flux in both paths is never zero at the same time, so that a force is always acting to hold the core in its energized position. Chattering of the valve core which might be caused by the magnetic flux passing through zero is thereby prevented.

The ends of the core 31 are preferably shaped so as to avoid a flat surface contact between the core and the shell 33, which might tend to produce humming in operation. As shown in the drawing, raised portions 35 and 36 at the core ends have curved surfaces which meet the flat surfaces of shell 33 in a line contact. It will be readily understood by those skilled in the art that other surface shapes might be used with equal facility, as long as a wide contact area is avoided.

Upon energization of the solenoid coil 18, the core 31 is attracted upwards and moves against the top of shell 33 striking it with a hammer blow which loosens the valve from its seat. As the attractive force continues, the core 31 continues to move upward, carrying with it the shell 33 and the valve 32 until the top of the shell 33 strikes the stop pin 25.

When the coil 18 is deenergized, the core 31 is no longer attracted upward. If no sticky deposit exists at the surfaces where shell 33 contacts stop pin 25 and plug 23, the shell 33 and core 31 will drop together until the shell is stopped by engagement of the valve with its seat. Thereafter, the core 31 will continue to fall within the shell 33 and will strike the bottom of the shell with a hammer blow tending to seat the valve more securely.

When a gummy deposit exists between the surfaces where shell 33 contacts stop pin 25 or plug 23, however, the shell may be held in its energized position. If a valve of conventional construction, having a core of a single integral piece, were to be held in this manner, it would stick in this position indefinitely. Since the core 31 is free to move within the shell 33, however, it will immediately fall upon deenergization of the coil 18 and will strike the bottom of shell 33 with a hammer blow sufficient to dislodge it from the sticky surfaces above it. Thereafter, the core 31 and shell 33 will fall together, and when the valve engages its seat the weight of the core 31 will cause it to be securely seated.

It should also be noted, that if the shell 33 is made of non-magnetic material, it is impossible for the core 31 to stick due to residual magnetism. Magnetic materials have been developed, however, which have so little hysteresis that they may be safely used for the manufacture of the core 31 and shell 33, with practically no possibility of the valve sticking due to residual magnetism.

Since the core 31 is sealed within the shell 33, none of the fluid passing through the valve may come in contact with it or with the surfaces which it touches. It is therefore impossible for a gum deposit to form in my device so as to prevent the hammer action described herein.

It will be seen, therefore, that I have described a device which effectively prevents sticking of a solenoid valve due to adhesion of the movable and stationary parts thereof. Moreover, the device is comparatively simple and inexpensive in construction.

While I have shown a specific embodiment of my invention, it will be understood that this is for purposes of illustration only and that my invention is limited only by the scope of the appended claim.

I claim as my invention:

An electromagnetic actuating mechanism comprising a coil having a central cylindrical opening therein, said opening being closed at one end and open at its other end, means including a cylindrical wall defining the coil opening for sealing said coil against the access of fluid thereto, a rod disposed centrally of said cylindrical coil opening for axial movement therein and having one end projecting through the open end of the cylindrical coil opening for actuation of a controlled device, a cylindrical armature of magnetic material comprising the sole means for shifting said rod in one direction upon energization of the coil and being operative to impart a driving movement to the rod on deenergization of the coil, and a closed cylindrical casing of smaller diameter than the coil opening and composed entirely of non-magnetic material housing the cylindrical armature and sealing the same against the access of fluid thereto, said casing surrounding the rod and being fixed at its opposite ends thereto for axial movement with the rod in the coil opening in spaced relation to the coil opening wall, the armature having a small central bore slidably receiving the rod and centering the armature for free movement axially of the casing and the rod, the armature being sufficiently smaller in diameter than the casing as to be movably guided by the rod in spaced relation to the surrounding wall of the casing, the opposite ends of the armature casing being spaced apart a distance greater than the length of the armature to provide for limited axial movement of the armature in the casing between such ends, but said casing being so located on the rod that the armature is at all times located at least partially within the coil and capable of actuation upon energization of the coil from its outermost position relative to the coil to move axially into engagement with one end of the armature casing and thereafter shift the rod and casing axially, and protuberant elements of small area located on the opposite ends of the armature and surrounding the rod for preventing sticking contact of the armature ends with the ends of the armature casing.

CLARENCE L. PETERSON.